UNITED STATES PATENT OFFICE 2,135,453

PREPARATION OF OXYGENATED ORGANIC COMPOUNDS

Donald John Loder, Wilmington, Del., assignor to E. I. du Pont de Nemours & Company, Wilmington, Del., a corporation of Delaware No Drawing. Application October 22, 1935,
Serial No. 46,119

29 Claims. (Cl. 260—532)

This invention relates to a process for the formation of organic compounds and particularly to the preparation of carboxylic acids by the interaction of aliphatic alcohols and carbon monoxide in the presence of a condensing agent.

Numerous processes have been proposed for the preparation of organic acids and their esters by the interaction in the vapor phase of organic compounds with the oxides of carbon. A liquid phase process is likewise described in the copending application of D. J. Loder, Serial No. 31,208, filed July 13, 1935, in which boron halides are used as the condensing agents. The acid products of the reactions therein disclosed are not usually obtained in the free state but are combined as an acid complex with the boron halide used. The separation of the acid-boron halide complex into free acid and free boron halide has proven to be a difficult and expensive operation.

An object of the invention is to provide a process for the preparation of higher molecular weight organic compounds through the introduction of carbon monoxide into lower molecular weight organic compounds. A further object of the invention is to provide a process for the preparation, in the liquid phase and in the presence of a condensing agent, of carboxylic acids by the condensation of aliphatic alcohols with carbon oxides.

A further object of the invention is to provide a process for the preparation of acids, having the structural formula $C_nH_{2n+1}COOH$, from alcohols, having the structural formula $C_nH_{2n+1}OH$, by subjecting the alcohols to the action of carbon monoxide in the presence of a condensing agent containing boron and fluorine in the presence of water.

Other objects and advantages of the invention will hereinafter appear.

I have found that organic acids can be prepared by passing carbon monoxide into a liquid alcohol in the presence of a highly active condensing agent and water. The condensing agents, which I have found most suitable for carrying out this process in the presence of water, are the compounds containing boron and a halogen. Due, apparently, to the exceedingly high activity of these catalysts, a solution containing an alcohol and a boron halide catalyst in the presence of water rapidly absorbs carbon monoxide. Moreover, in contradistinction to the reaction when conducted under more or less anhydrous conditions in which the products are fixed with the catalyst as a complex, the products of the present invention are in a free state and can be readily separated from the other products of the reaction and the catalyst. This separation step can be carried out by the simple distillation of the product which gives the acid directly as the condensate while simple distillation of the product containing the acid-catalyst complex will not give free acid.

The alcohol-carbon monoxide liquid phase reactions which can be accelerated by the condensing agents of the present invention, in a manner which will be more carefully emphasized hereafter, may be expressed as follows:

$$C_nH_{2n+1}OH + CO \rightarrow C_nH_{2n+1}COOH$$

In accordance with the particular operating conditions, it will be found that, in some instances, the acids may not be formed as the acid, but may be produced as an ester by condensation of the acids formed with the particular alcohol used in the process, as indicated below:

$$C_nH_{2n+1}COOH + C_nH_{2n+1}OH \rightarrow C_nH_{2n+1}COOC_nH_{2n} + H_2O$$

The alcohols used may be replaced, if desired, wholly or partly by the corresponding alkyl ethers of the alcohols such as dimethyl ether, diethyl ether; or the mixed alkyl ethers, such, for example, as methyl ethyl ether, ethyl propyl ether; or the alkyl esters, the alkyl amines, or the alkyl halides. Compounds which decompose upon hydrolysis to give the alcohol may likewise be used.

My preferred condensing agent is an aqueous solution of boron fluoride which may be added to the alcohols, to be reacted, prior to the introduction of the carbon monoxide. Other compounds which contain boron and a halogen and water may be employed, such, for example, as aqueous solutions of dihydroxyfluoboric acid, borofluohydric acid, and, in general, the oxygenated acids obtained from mixtures of hydrogen fluoride and the boric acids. Aqueous solutions of boron fluoride, as well as the other condensing agents, may be used alone or in the presence of addition agents, such as, powdered nickel, nickel oxides, or other powdered metals or metal oxides which may be introduced to promote the activity of the condensing agent. Generally, however, I prefer to use aqueous boron fluoride alone for it is not only easily prepared but is such a powerful condensing agent that promoters for further extending its condensing ability are not ordinarily necessary.

The ratio of water to the boron fluoride may vary through wide limits but for the greater number of reactions it has been found that for optimum results the ratio of water to the boron fluoride should be preferably not appreciably more than 5 mols of water per mol. of the boron fluoride, although a greater amount of water may be present. The optimum ratio appears to be 1 mol. of the boron fluoride to 2.3 to 2.5 mols of water. The presence of water with the catalyst is essential to this invention and consequently whenever the catalyst is hereinafter referred to it will be understood that water will also be included whether named or not.

While I have indicated that an aqueous solution of boron fluoride is my preferred condensing agent and boron-halogen compounds are generally highly active, nevertheless, for the reaction of some alcohols with the carbon monoxide, aqueous solutions of other metal or metalloid halides may likewise be employed. Among these condensing agents are included the following halides of ampoteric elements and elements which form but weak bases, and more particularly such elements which form addition compounds with water: magnesium fluoride, calcium fluoride, titanium fluoride, antimony fluoride, and the chlorides, bromides, fluorides, and iodides of the above metals including boron as well as such halides of aluminum, beryllium, zirconium, hafnium, columbium, sulfur, silicon, phosphorus, tantalum, chromium, vanadium, tungsten and molybdenum.

My preferred condensing agents may be used in various proportions which are governed by the type of alcohol being treated. In the absence of addition agents they may be used in proportions ranging from 0.25 to 2.0 mols or higher calculated on the metal halide present per mol. of the alcohol or other compound reacted while in the presence of addition agents much lower amounts may be employed, say, generally, from 1 to 5% and, in some instances, higher percentages may be required. The activity of the addition agent determines in large measure the amount required, the particular alcohol or alcohols as well as the temperature and pressure conditions also being considered.

The synthesis can generally be efficiently carried out under the following operating conditions. The pressure may vary from atmospheric pressures up to 1000 atmospheres or even more. Generally, it appears preferable to operate in the neighborhood of from 350 to 900 atmospheres. The temperature within the reaction zone is not particularly critical for, with the highly efficient condensing agent used, the reaction will proceed from room temperature up to approximately 350° C. I prefer, however, to operate within the range of from 180–260° C., under which temperature conditions side reactions are minimized.

The carbon monoxide used may be obtained from various commercial sources, such, for example, as water gas, producer gas, coke oven gas, and the like, but to obtain products of the highest degree of purity it is preferable to remove from such commercial gases the objectionable constituents such as sulfur compounds, metal carbonyls, etc.

Furthermore, inert gases may be present in the carbon monoxide used and they are, in some instances, desirable. Nitrogen, for instance, has, it appears, little deleterious effect on the reaction or yield and, in fact may be used advantageously in order to aid in the agitation of the alcohol, particularly if the carbon monoxide is bubbled into the alcohol. Other strictly inert gases will usually act similarly to nitrogen. It is, of course, understood that instead of introducing an alcohol into the reaction chamber substances or mixtures of substances which decompose or react to form alcohols or esters may be employed, but generally I prefer to use a liquid alcohol.

Not only can methanol be condensed in the presence of carbon monoxide to acetic acid or the reaction product of the acetic acid with methanol, i. e. methyl acetate, but the higher alcohols, and particularly normal alcohols, such as ethyl alcohol, propyl alcohol, butyl alcohol and the higher molecular weight alcohols, such, for example, as hexyl alcohol or octyl alcohol, may be similarly converted. Isobutyl alcohol and the secondary and tertiary alcohols such as tertiary butyl alcohol and the like may be reacted but usually the reaction does not proceed as cleanly for many side products are produced along with the acids. The process is likwise applicable to the preparation of the polycarboxylic acids from the polyhydroxy alcohols such as 1,3 propylene glycol, decamethylene glycol, tetrahydro furane and the like.

I shall now describe specific embodiments of my process but it will be understood that the details therein given and the compounds employed, either as reactants or as condensing agents, in no way restrict the scope of the invention, but merely illustrate methods by which my process may be carried out.

Example 1.—Into a pressure-resisting autoclave containing methanol is passed a molecular equivalent weight of boron fluoride together with three mols of water. To the resulting mixture carbon monoxide is added until a pressure of 700 atmospheres is attained. The temperature is held at approximately 260° C. and the reaction is continued until analysis shows that an equivalent weight of CO has been reacted.

The pressure is released, the temperature of the reaction mass cooled and the crude product distilled. An aqueous acetic acid distills over and simultaneously with the withdrawal of water through distillation, water, as such, or as steam, is added to the crude at substantially the same rate. The reaction mixture yields 75% of acetic acid.

Example 2.—Ethanol may be reacted according to the conditions and procedure given in Example 1 with a yield of 45–50% of the amount of propionic acid theoretically obtainable.

Example 3.—(a) 1696 parts of solid orthoboric acid are placed in a suitable pressure-sustaining vessel and 1643 parts of liquid hydrofluoric acid are added. The mixture is cooled to about 10° C. to prevent loss of hydrogen fluoride and when the solution of the hydrofluoric acid and boric acid is complete there is obtained a mobile liquid containing three mols of water per mol. of boron trifluoride having a specific gravity of approximately 1,500 at 20° C.

(b) 205 parts of the liquid catalyst prepared as directed under Example 3a are charged with 54 parts of methanol into a pressure-resisting autoclave. Carbon monoxide is injected until a pressure of 800 atmospheres is attained. The reaction is conducted at a temperature of 260° C. until approximately 47 parts of carbon monoxide has been absorbed. The process of separation given in Example 1 was used to give a 79% yield of acetic acid.

Example 4.—A high pressure, silver lined autoclave was charged with 163.5 parts by weight $Et_2O \cdot BF_3$ and 98.9 parts by weight $HOH \cdot BF_3$.

The autoclave in a shaker machine was heated to 170° C. under an initial CO pressure of 575 atmospheres (at room temperature). Gas absorption began to take place at 158° C. The pressure was thereafter maintained at 800 atmospheres. At the end of 29 minutes at temperature, a pressure drop of 610 atmospheres had occurred. The crude product had increased 43.6 parts by weight. Fractionation of the crude product yielded 141.4 parts by weight of propionic acid-boron fluoride complex, which is equivalent to 51.8% of the theoretical yield based on the ethyl ether charged.

The distillation step designated in Example 1 makes it possible rapidly and effectively to separate the acid from the crude products of the reaction. It has been found that if the water to boron fluoride ratios falls below 2 mols of the former to 1 mol of the latter hydrofluoric acid will distill over with the acid which necessitates subsequent purification steps to obtain a pure product. It is accordingly desirable to maintain the water to boron halide during the distillation at such a ratio that the halide does not decompose to the hydrogen halide. This may be accomplished by intermittently or continuously adding water or steam to replace that lost through distillation.

From a consideration of the above specification it will be realized that many changes may be made in the details therein given without departing from the invention or sacrificing any of the advantages that may be derived therefrom.

I claim:

1. A process for the preparation of oxygenated organic compounds which comprises contacting, at a temperature below 350° C., and in the liquid phase, carbon monoxide and a compound selected from the group consisting of aliphatic alcohols and compounds which will hydrolyze to an aliphatic alcohol, with, per mol of the compound, from 0.25 to 2.0 mols of an aqueous halide of an element selected from the group consisting of the amphoteric elements and the elements which form weak bases, as the condensing agent.

2. A process for the preparation of oxygenated organic compounds which comprises contacting, at a temperature below 350° C., under superatmospheric pressure and in the liquid phase, carbon monoxide and a compound selected from the group consisting of aliphatic alcohols and compounds which will hydrolyze to an aliphatic alcohol, with, per mol of the compound, from 0.25 to 2.0 mols of an aqueous halide of an element selected from the group consisting of the amphoteric elements and the elements which form weak bases, as the condensing agent.

3. A process for the preparation of organic acids which comprises contacting, at a temperature below 350° C. and in the liquid phase, carbon monoxide and a compound selected from the group consisting of aliphatic alcohols and compounds which will hydrolyze to an aliphatic alcohol, in the presence of from 0.25 to 2.0 mols of a non-metal halide hydrate condensing agent per mol of the compound.

4. A process for the preparation of organic acids which comprises contacting, at a temperature below 350° C. and in the liquid phase, carbon monoxide and a compound selected from the group consisting of aliphatic alcohols and compounds which will hydrolyze to an aliphatic alcohol, in the presence of, per mol of the compound, from 0.25 to 2.0 mols of a condensing agent containing boron, a halogen and water.

5. A process for the preparation of organic acids which comprises reacting, at a temperature below 350° C. and in the liquid phase, an alcohol and carbon monoxide, in the presence of from 0.25 to 2 mols of an aqueous boron halide condensing agent per mol of alcohol.

6. A process for the preparation of organic acids which comprises reacting, at a temperature below 350° C. and in the liquid phase, an alcohol and carbon monoxide, in the presence of boron fluoride and water, in the ratio of not more than approximately 5 mols of water per mol of boron fluoride.

7. A process for the preparation of organic acids which comprises reacting, at a temperature below 350° C. and in the liquid phase, an alcohol and carbon monoxide in the presence of boron trifluoride and water in the ratio of 1 mol of boron trifluoride to 3 mols of water.

8. A process for the preparation of acetic acid which comprises reacting, at a temperature below 350° C. and in the liquid phase, methanol and carbon monoxide, in the presence of boron fluoride and water, in the ratio of not more than approximately 5 mols of water per mole of boron fluoride.

9. A process for the preparation of propionic acid which comprises reacting, at a temperature below 350° C. and in the liquid phase, ethanol and carbon monoxide, in the presence of boron fluoride and water, in the ratio of not more than approximately 5 mols of water per mol of boron fluoride.

10. A process for the preparation of propionic acid which comprises reacting, at a temperature below 350° C. and in the liquid phase, diethyl ether and carbon monoxide, in the presence of boron fluoride and water, in the ratio of not more than approximately 5 mols of water per mol of boron fluoride.

11. A process for the preparation of an organic acid which comprises reacting, at a temperature below 350° C. and in the liquid phase, carbon monoxide and a compound selected from the group consisting of aliphatic alcohols and compounds which will decompose, on hydrolysis, to form an alcohol, in the presence of, per mol of the compound, from 0.25 to 2 mols of an aqueous halide of an element selected from the group consisting of the amphoteric elements and the elements which form weak bases, as the condensing agent, and subsequently distilling the acid from the crude product.

12. A process for the preparation of an organic acid which comprises reacting, at a temperature below 350° C. and in the liquid phase, carbon monoxide and a compound selected from the group consisting of aliphatic alcohols and compounds which will decompose, on hydrolysis, to form an alcohol, in the presence of, per mol of the compound, from 0.25 to 2 mols of an aqueous halide of an element selected from the group consisting of the amphoteric elements and the elements which form weak bases, as the condensing agent, and subsequently distilling an aqueous acid from the crude product.

13. A process for the preparation of an organic acid which comprises reacting, at a temperature below 350° C., carbon monoxide and a compound selected from the group consisting of aliphatic alcohols and compounds which will decompose, on hydrolysis, to form an alcohol, in the presence of an aqueous halide of an element selected from the group consisting of the amphoteric elements and the elements which form weak bases as the condensing agent, and subsequently distilling an aqueous acid from the crude product while replacing the water lost through distillation.

14. A process for the preparation of acetic acid which comprises reacting, under a pressure of from 350 to 900 atmospheres and at a temperature of from 180° to 350° C., one mol of carbon monoxide with one mol of methanol, in the presence of 0.25 to 2.0 mols of a boron halide catalyst resulting from interacting three mols of liquid hydrofluoric acid with one mol of orthoboric acid, and distilling the acetic acid from the reaction product while replacing the water lost through distillation.

15. A process for the preparation of acetic acid which comprises reacting, under a pressure of 700 atmospheres and at a temperature of 260° C., one mol of carbon monoxide with one mol of methanol, in the presence of one mol of a boron halide catalyst resulting from interacting three mols of liquid hydrofluoric acid with one mol of orthoboric acid, and distilling the acetic acid from the reaction product while replacing the water lost through distillation.

16. In a liquid phase process for the preparation of oxygenated organic compounds, the steps which comprise passing a methoxy compound of low molecular weight and carbon monoxide into a reaction zone, in which has been charged, per mol of the methoxy compound, from 0.25 to 2.0 mols of an aqueous boron halide and reacting therein the carbon monoxide with the methoxy compound.

17. In a liquid phase process for the preparation of oxygenated organic compounds, the steps which comprise passing methanol and carbon monoxide into a reaction zone in which has been charged an aqueous boron halide and reacting therein the carbon monoxide with the methanol.

18. In a liquid phase process for the preparation of acetic acid, the steps which comprise introducing methanol and carbon monoxide into a reaction zone in which has been charged a hydrated boron fluoride and reacting the carbon monoxide with the methanol.

19. A liquid phase process of reacting carbon monoxide and a compound selected from the group consisting of aliphatic alcohols and compounds which give an aliphatic alcohol, upon hydrolysis, in the presence of from 0.25 to 2.0 mols of an aqueous boron halide per mol of the compound and thereby producing an oxygenated organic compound.

20. A liquid phase process of reacting a methoxy compound of low molecular weight and carbon monoxide, in the presence of from 0.25 to 2.0 mols of an aqueous boron halide per mol of the compound, and thereby producing an oxygenated organic compound.

21. A liquid phase process of reacting methanol and carbon monoxide, in the presence of from 0.25 to 2.0 mols of an aqueous boron halide per mol of methanol, and thereby producing an oxygenated organic compound.

22. A liquid phase process of reacting methanol and carbon monoxide, in the presence of a hydrated boron fluoride, and thereby producing acetic acid.

23. A liquid phase process of reacting carbon monoxide with a compound selected from the group consisting of aliphatic alcohols and compounds which give an aliphatic alcohol, upon hydrolysis, in the presence of boron fluoride and water, and thereby producing an oxygenated organic compound.

24. A liquid phase process of reacting methanol and carbon monoxide, in the presence of boron fluoride and water, and thereby producing acetic acid.

25. A liquid phase process of reacting an aliphatic alcohol and carbon monoxide, in the presence of a compound resulting from the interaction of solid orthoboric acid with liquid anhydrous hydrofluoric acid.

26. The process of claim 23 conducted at a temperature of from 130 to 350° C.

27. The process of claim 23 conducted at a temperature of from 180 to 350° C. and at elevated pressures up to 1000 atmospheres.

28. A liquid phase process of reacting an aliphatic alcohol and carbon monoxide, in the presence of, per mol of alcohol, from 0.25 to 2 mols of a catalyst containing substantially one mol of boron per three mols of halide and resulting from the interaction of a boric acid with hydrogen halide.

29. A liquid phase process of reacting an aliphatic alcohol and carbon monoxide, in the presence of a catalyst containing substantially one mol of boron per three mols of fluoride and resulting from the interaction of a boric acid with hydrogen fluoride.

DONALD JOHN LODER.